United States Patent
Thome et al.

(10) Patent No.: US 6,732,169 B1
(45) Date of Patent: May 4, 2004

(54) NETWORK TRANSMISSION CIRCUIT CONTROL METHOD AND SYSTEM

(75) Inventors: Franck Thome, Antony (FR); Fabien Heritier, Paris (FR); Bertrand Lapraye, Gif sur Yvette (FR)

(73) Assignee: Alcatel, Paris (FR)

( * ) Notice: Subject to any disclaimer, the term of this patent is extended or adjusted under 35 U.S.C. 154(b) by 509 days.

(21) Appl. No.: 09/669,550

(22) Filed: Sep. 26, 2000

(30) Foreign Application Priority Data

Sep. 27, 1999 (FR) .......................................... 99 11990

(51) Int. Cl.$^7$ ............................................ G06F 15/173
(52) U.S. Cl. ..................... 709/223; 709/224; 709/225; 714/57
(58) Field of Search ................................ 709/223, 224, 709/225; 714/57

(56) References Cited

U.S. PATENT DOCUMENTS

| | | | | |
|---|---|---|---|---|
| 4,388,715 A | * | 6/1983 | Renaudin et al. | 370/244 |
| 5,388,189 A | * | 2/1995 | Kung | 706/45 |
| 5,617,311 A | * | 4/1997 | Easter et al. | 700/80 |
| 5,828,830 A | * | 10/1998 | Rangaraian et al. | 714/48 |
| 5,870,676 A | * | 2/1999 | Durvasula et al. | 455/450 |
| 6,041,062 A | * | 3/2000 | Yamato et al. | 370/465 |
| 6,058,103 A | * | 5/2000 | Henderson et al. | 370/254 |
| 6,144,633 A | * | 11/2000 | Ikeda et al. | 370/217 |
| 6,240,067 B1 | * | 5/2001 | Sorber | 370/236 |
| 6,356,282 B2 | * | 3/2002 | Roytman et al. | 345/736 |
| 6,401,119 B1 | * | 6/2002 | Fuss et al. | 709/224 |
| 6,446,224 B1 | * | 9/2002 | Chang et al. | 714/54 |
| 2003/0076851 A1 | * | 4/2003 | Mahajan et al. | 370/419 |

OTHER PUBLICATIONS

Hajela, S.: "HP OEMF: Alarm Management in Telecommunication Networks" Hewlett Packard Journal, US, Hewlett–Packard CO. Palo Alto, vol. 47, No. 5, Oct. 1, 1996, pp. 22–30, XP000631663.

Garandel, R.: "Network Experimentation with Q3 Interface" IEEE Network Operations and Management Symposium (NOMS), US, New York, IEEE, vol. SYMP. 5, 1996, pp. 501–509, XP000634814 ISBN: 0–7803–2519–2.

\* cited by examiner

*Primary Examiner*—Glenton B. Burgess
*Assistant Examiner*—Yasin Barqadle
(74) *Attorney, Agent, or Firm*—Sughrue Mion, PLLC

(57) ABSTRACT

To solve problems of congestion of processing caused by the simultaneous occurrence of a very large number of alarms, the alarms are processed off-line or at least as not particularly urgent tasks. In practice, assessing the severity of an alarm is not treated in itself as an urgent event, even if the assessed severity indicates that the alarm is associated with a very serious event. It is shown that by operating in this way it is possible to retain control over a system for managing a transmission network and to avoid being unable to react if the network is subject to a major disruption, in particular if a very high rate link fails.

16 Claims, 1 Drawing Sheet

NETWORK TRANSMISSION CIRCUIT CONTROL METHOD AND SYSTEM

The present invention relates to a network transmission circuit control method and system. The network in question is essentially a regional telecommunications network,. i.e. a network able to administer a large number of users, for example around one million users.

BACKGROUND OF THE INVENTION

At national level, telephone operators organize calls within their general network by means of networks which typically include a thousand routing and drop-and-insert nodes, also referred to as network elements (NE). The regions to which the networks relate are either large provinces or large towns, the number of users to be connected being no more than an inaccurate indication. The routing nodes of these networks are generally interconnected by STM16 links, i.e. links capable of transmitting data at a bit rate of 2.5 Gbit/s. The links can also be STM1 links (an STM16 link is equivalent in terms of bit rate to sixteen STM1 links) which offer bit rates of 155 Mbit/s, 3×34 Mbit/s, 3×45 Mbit/s, 21×6 Mbit/s or 63×2 Mbit/s, depending on how they are configured. These bit rates are used to construct architectures matched as closely as possible to requirements. The plant installed at each node and the plant configurations depend on local requirements in the vicinity of the node. SDH networks are networks of the above kind. Some network nodes have their own special features.

Some nodes are connected to inter-regional optical fiber links, for example transoceanic links, in particular links under the Atlantic Ocean. In this case the bit rates encountered are of the order of 40 Gbit/s for each optical fiber. An optical fiber link contains several optical fibers capable of bit rates of this magnitude.

Other nodes also have functions complementary to the routing and drop-and-insert functions which are specific to the other nodes. These other nodes are gateway nodes, which are also referred to as gateway network elements (GNE), and connect a network management unit to each network node.

The network management unit, which is referred to hereinafter as the network management system, includes signaling links for organizing the interconnection and working of the routing and drop-and-insert nodes of the network. The information on these signaling links can also be routed via normal channels of the network.

Because an SDH network has a meshed structure, any two points of the network can be interconnected via multiple paths. If a network link fails, the traffic carried by that link can be diverted to other links between the same departure and arrival points. Transmission is modified at the request of clients who are either operators, i.e. physical persons operating the controls of the network management system (keyboard, mouse, or other devices), or automatic processes initiated on demand by the network management system when it receives from a routing node a reorganization request concerning that node. For example, for the bit rates indicated above, the plant at a node can be modified to change it from one architecture and a given bit rate to another architecture and another bit rate, for example from 3×45 Mbit/s to 21×6 Mbit/s. These configuration changing tasks are never urgent and can be deferred for a few seconds or even a few minutes. They are the responsibility of the network management system which, to prevent overloads, assigns priorities to the tasks to be undertaken.

For example, input/output management must be processed with a higher priority than configuration management or network reorganization. A third type of action has an even higher priority, namely actions programmed at fixed times, for example to verify the status of connections to the network nodes.

To manage priority levels, a central system of the network management system distributes the tasks to be effected by the network management system between a number of stacks, namely a highest priority synchronization (timer) stack, an input/output management stack and a deferred jobs stack. The network management system processes jobs which have accumulated in a stack of relatively lower priority only if all jobs which have accumulated in stacks of relatively higher priority have been processed. Accordingly, each time the network management system receives a request, an input/output request or a synchronization instruction, it stores it in the corresponding stack and processes it according to its priority.

Some events, namely alarms which can be of many different kinds, receive special processing within this hierarchy. Obviously they do not have an a priori priority level. Nevertheless, because they constitute events affecting the continued existence of the network, and potential total breakdown of the network, alarms must be processed with the maximum priority, essentially so as at least to give them a severity level for assessing the scale and the urgency of the reaction to the fault that the alarms represent. Accordingly, the central system of the network management system processes all alarms as soon as they arrive, giving them priority over other events.

It is apparent that this type of operation leads in some cases to blockage of the network management system. If a high bit rate link deteriorates, for example a transoceanic optical fiber link of the kind referred to above, the number of "transmission impossible" alarms allocated to transmission channels using that optical fiber becomes very large. For a given network management system architecture, an alarm processing rate of the order of 20 alarms per second has been adopted. Because in practice the network management system processes not only alarms but also other actions, the usable alarm processing rate is of the order of five alarms per second. If a very high bit rate link fails a thousand or even several thousand alarms may be sent.

With a number of alarms of this magnitude, the network management system is immobilized for about twenty minutes while it processes all the alarms. Operations requested of the network management system cannot be processed before the end of this time. This can block the network management system and suspend the network supervision service.

A solution entailing oversizing the network management system plant is not economically viable because massive alarm situations do not arise frequently, and because it would entail providing a plethora of processing means whose own reliability could become a problem in itself, and might even run the risk of not leading to a reasonable solution to the blocking problem.

OBJECTS AND SUMMARY OF THE INVENTION

The invention proposes a simpler solution to the problem. It has been realized that, when a fault occurs, the reaction to the fault could not be rapid in any event. An optical fiber cannot be repaired by remote control. The invention therefore divides the processing of initially monolithic alarms ("monolithic" in the sense that several dozen alarms can be contained in a single message incoming into the system)

which have high priority into a succession of shorter processes which take up less time (which deal with five alarms at a time, for example), and allocates lower priority to these processes. Accordingly, and keeping a sense of proportion, assessing the severity of an alarm is in itself regarded as a non-urgent task. Consequently, according to the invention, if one or more alarms occur, a central system of the network management system executes (or causes to be executed) a very fast task which can itself be one of the highest priority tasks and which breaks alarms in the incoming stream of alarms down into lower priority tasks, each responsible for processing a smaller number of alarms, for example five alarms. The processing entails forwarding the alarms in a more complete format. This prevents the physical persons operating the system losing control of the network management system.

The invention therefore provides a method of managing transmission circuits of a network, in which method:

a network management system receives configuration and/or connection requests and, from communications nodes of the network, priority alarms relating to the status of the network, the network management system organizes the priorities of the requests received, and the network management system processes the requests to send instructions for actions that correspond to them, wherein:

the network management system assigns a lower priority to the alarms as soon as they are received and stores them in memory means, and the network management system processes the alarms stored in said memory means in turn.

The invention also provides a system for managing transmission circuits of a network, the system including:

a network management system for receiving configuration and/or connection requests and, from communications nodes of the network, alarms relating to the status of the network, for organizing the priorities of the received requests, and for processing the requests to send instructions for actions that correspond to them, the system including:

means for assigning the alarms a lower priority as soon as they are received, storing them in memory means and then processing them in turn when the requests stored in the memory means are processed.

In one embodiment of the invention, the memory means takes the form of a queue corresponding to said lower priority and in which the alarms are stored in chronological order.

BRIEF DESCRIPTION OF THE DRAWING

The invention will be better understood on reading the following description and examining the accompanying FIG. 1, which is provided by way of illustrative and non-limiting example of the invention.

MORE DETAILED DESCRIPTION

Figure 1:
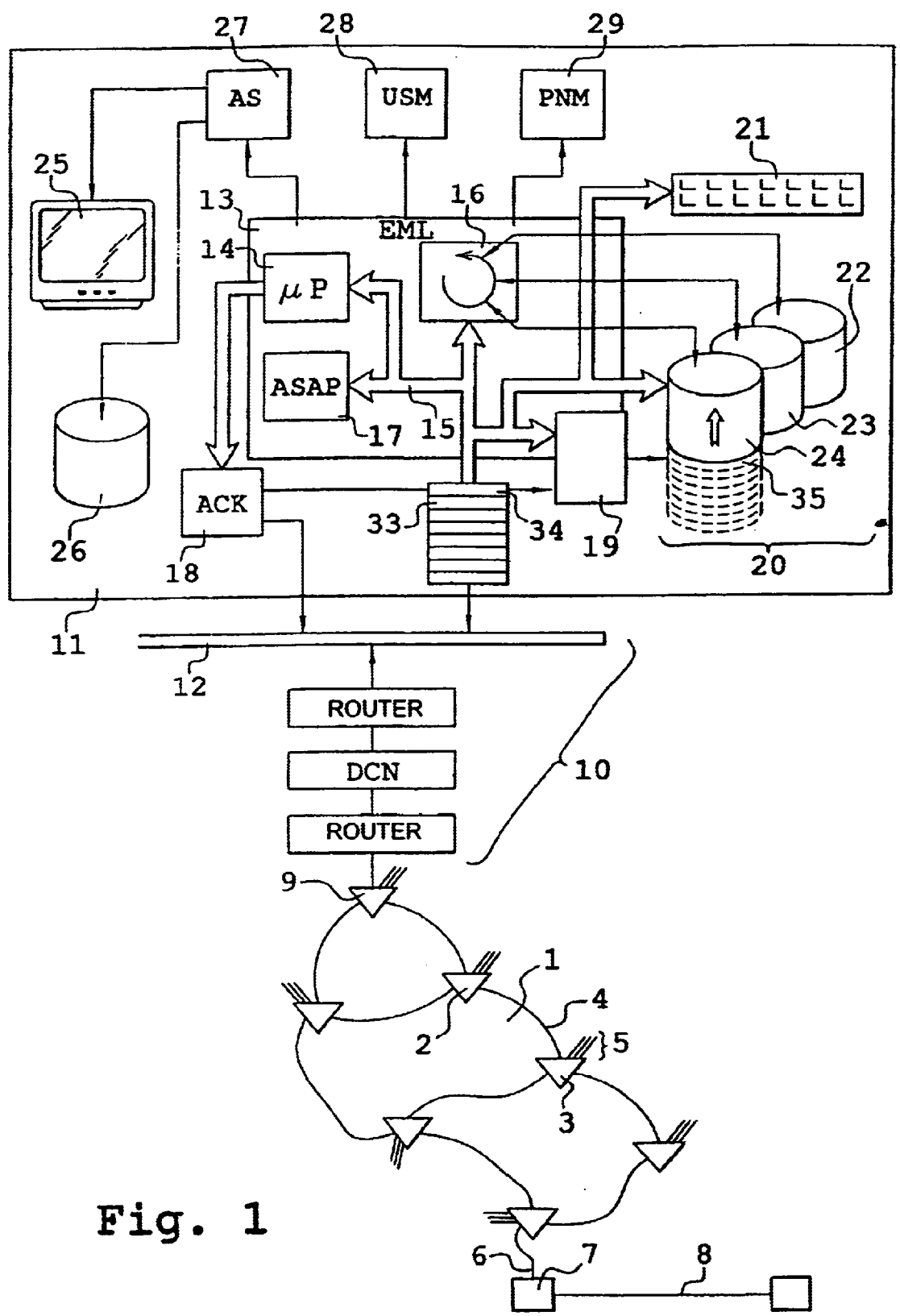
FIG. 1 is a diagrammatic representation of the transmission circuits of a network using the method of the invention.

Figure shows an SDH network 1. The network 1 includes communications nodes 2 and 3 connected by physical communications links 4 which can in practice be STM16 links, which have a high bit rate. Each node also includes drop-and-insert means 5 enabling calls from users near a node to be routed to other users near another node or the same node.

The network 1 also includes a link 6 to a very high bit rate transmission node 7 on a transmission line 8 which in one example includes a bundle of optical fibers. The plant of the node 7 can in particular transmit wavelength division multiplexed (WDM) data for processing.

The network 1 includes a gateway node 9 connected by a management channel 10 to a network management system 11. The network management system 11 can be based on a distributed architecture with multiple processors and peripheral circuits interconnected by a link 12 of a local area network. The link 10 is a signaling and management link. The gateway 9 transmits configuration instructions to the nodes 2 and 3 via standard links such as the link 4 or dedicated signaling links. The management channel 10 includes in particular routers which encapsulate instructions to be transmitted to the plant of the nodes 2 and 3 so that the instructions reach them.

The network management system 11 includes a central system and a central element management layer (EML) process 13 which in principle includes a processor 14 serving as an arithmetic and logic unit of the central process 13. The processor 14 is connected by a bus 15 to program memories 16 and 17 and to external and internal peripheral circuits 18 and 19. It is also connected to storage memories 20. The program memories 16 and 17 are shown differently here to explain the process. However, they can be combined and form the operating system of the central process 13 and in practice they can be loaded into the working memory of the processor 14. The program memory 16 corresponds to an event manager. The program memory 17 stores in particular a correspondence table relating probable causes and severities of alarms. This representation is diagrammatic, and in practice only the actions effected by the central process will be described in detail. The processors, program memories and data memories used to complete them can have highly varied architectures.

Under the control of the program contained in the memory 16, the process 13 organizes the priority of requests received from the operator of the management systems of the network 1. The requests can nevertheless be received by other peripherals, for example a control keyboard 21, or more generally a workstation 21 worked by an operator. Organizing requests entails stacking them in the memory 20 in accordance with different priority orders, depending on the urgency of accomplishing the tasks that they represent and on the chronological order in which they arrive. For example, a stack 22 of the memory 20 stores all requests relating to synchronization actions which are the most urgent. A stack 23 sorts the various requests to set up input and output circuits in each of the nodes 2 and 3. A very fast reaction is required for executing tasks from the stack 22. A fast reaction is required for input-output management. Some other tasks, stored in the stack 24, concern requests emanating from clients relating to re-routing, modifying configurations, creating connections between two nodes or configuring levels. They are less urgent.

After storing the requests in the stacks 22 to 24, the process 13 under the control of the program from the memory 16 causes the accumulated tasks to be processed. In practice an event manager manages all events occurring within the system. Events can be of three types: programmed tasks (timers), input/output (I/O) events, and deferred tasks (jobs), which are processed in this order. Processing includes in particular sending instructions to the nodes 2 and 3 via the link 10 which conform to the content of requests for configuring the nodes.

The network management system 11 also receives alarm signals or alarms reporting a malfunction of a network unit, a routing node or a link between two nodes from the network and from the communications nodes 2 and 3. In the prior art, such alarms are processed with the highest priority by the process 13 which employs programs including an alarm processing program. The process 13 uses an ASAP (alarm severity assignment profile) data structure for assigning severity, and this structure is stored in the severity assignment memory 17. According to this structure, the process 13 assigns a severity level to each alarm, in accordance with a hierarchy.

The hierarchy can be tied to the object concerned, the routing node 2 or the link 4 at which the alarm was produced. The hierarchy can also depend on the context, the seriousness of an alarm being in proportion to the intensity of use of the equipment unit concerned. Under normal circumstances the process 13 receives the alarm, assigns it a severity level and produces a summary of the alarms relating to a node. The most serious alarm relating to the node conditions its status. Under the control of the ASAP program, the process 13 then uses a different protocol to send information concerning the alarms processed for display on a screen 25 and for storage in a memory 26. This process includes an AS (alarm severity) application 27.

A user service management (USM) application 28 displays the summary relating to each equipment unit, for example a routing node. A physical network management (PNM) application 29 shows the topology of the network.

Here an application is a series of processes effected on data by a data processing system which has hardware resources and software resources. Because the software resources are programs stored in physical memories, all of the hardware and software resources are implemented in the form of circuits.

Alarms displayed on the display devices of the applications 27, 28 and 29 can be classified to attract the attention of an operator more or less strongly by assigning them levels of seriousness known as warning, minor, major and critical, and by combining the display with the use of a respective blue, yellow, orange or red color for information displayed in the form of an icon. The set of operations effected by the process 13 under the control of the program 17 can block the processor 14 or render it temporarily unavailable to react to the program in the memory 16 and/or the workstation 21, for as long as the alarms received have not all been processed.

According to the invention this problem is solved by converting the alarm signals received into tasks of lower priority, typically tasks which can be stored in the stack 24 of the memory 20. To this end, in one example, the alarms can be received in a buffer memory 33. The alarms received in the memory 33 are then managed by a process specific to the invention. That process can be stored in the program memory 19. In practice the program from the memory 19 can be coincident in this case with that of the memories 16 or 17 (and thereby be contained in the process 13). The program from the memory 19 can be replaced by an automaton internal or external to the central process 13 and include its own mode of operation. In both cases the function executed consists of recognizing alarms in the signals received. The fact that a signal is an alarm signal is indicated either by virtue of the absence of a priority level or by the presence in the signal itself of a header indicating that it is an alarm signal.

In accordance with the invention, the processing effected by the process 13, or an equivalent, autonomous and decentralized automaton, then has the function of transferring an alarm received in the buffer memory 33 into the queue of the stack 24 of tasks (in this example these are the less urgent tasks). The process 13 remains available for processing events stored in the stacks 22, 23 or 24 and preceding the alarm signals because it does not then effect any severity assigning, summarizing or display processing on the devices 27 to 29.

Given the duration previously referred to, and the processing bit rate of the central unit 14, it is preferable, if possible, to memorize not a single alarm 34 but instead five successive alarms as the task 35. This is possible if several alarms are stacked one behind the other. However, it is also possible to provide an intermediate buffer memory in which alarms are stored temporarily and from which they are transferred into the stack 24 at location 35 only when five alarms are present. Such operation will preferably be tied to a maximum time-delay: beyond a certain duration, transfer into location 35 will happen anyway, whether five alarms have been assembled or not.

The invention preferably processes all alarms in this way by stacking them in the stack 24, whether there is only one alarm or a whole stream of them.

The invention therefore solves problems of processing congestion caused by the simultaneous occurrence of a very large number of alarms. The alarms are treated off-line, or at least as not particularly urgent tasks. In practice, assessing the severity of an alarm is not itself treated as an urgent event, even if the assessed severity indicates that the alarm is associated with a very serious event.

What is claimed is:

1. A method of managing transmission circuits of a network, in which a network management system:
   receives configuration and/or connection requests and, from communications nodes of the network, priority alarms relating to the status of the network,
   organizes the priorities of the requests received, and
   processes the requests to send instructions for actions that correspond to the configuration requests, the connections requests and the priority alarms, wherein, in response to the priority alarms, the network management system then:
   lowering the priority of all of the priority alarms as they are received, regardless of the number of priority alarms received, and stores them in memory means, and
   processes the alarms stored in said memory means in turn.

2. A method according to claim 1, wherein said memory means comprise a queue corresponding to said lower priority and in which said alarms are stored in chronological order.

3. A method according to claim 1, wherein the network management system groups a stream of received alarms into packets of five before storing them in said memory means.

4. A method according to claim 1, wherein, for processing alarms, the network management system assigns a severity level to each alarm.

5. A method according to claim 1, wherein the network management system assigns the alarms a lower rank and/or causes them to be stored in said memory means by a decentralized automaton.

6. A method according to claim 1, wherein the network management system receives the alarms in a buffer memory.

7. A system for managing transmission circuits of a network, the system comprising:
   a network management system for receiving configuration and/or connection requests and, from communications nodes of the network, alarms relating to the status of the network, for organizing the priorities of the received requests, and for processing the requests to send instructions for actions that correspond to the configuration requests, the connections requests and the priority alarms, the system including means for lowering the priority of all of the priority alarms as they are received, regardless of the number of priority alarms received, storing them in memory means and then processing the alarms stored in said memory means in turn.

8. A system according to claim 7, wherein said memory means comprise a queue corresponding to said lower priority and which said alarms are stored in chronological order.

9. A system according to claim 7, wherein the network management system includes a decentralized automaton for assigning a lower rank to the alarms.

10. A system according to claim 7, wherein the network management system includes a decentralized automaton for storing said alarms in said memory means.

11. A system according to claim 7, wherein the network management system includes a buffer memory which can be used to store the alarms in said memory means.

12. A system for managing transmission circuits of a network, the system comprising:

a network management system for receiving configuration and/or connection requests and, from communications nodes of the network, alarms relating to the status of the network, for organizing the priorities of the received requests, and for processing the requests to send instructions for actions that correspond to the configuration requests, the connections requests and the priority alarms, the system further comprising an element management layer process for lowering the priority of all of the alarms as they are received, regardless of the number of priority alarms received, storing them in memory and then processing the alarms stored in the memory in turn.

13. A system according to claim 12, wherein memory comprises a queue corresponding to the lower priority and which the alarms are stored in chronological order.

14. A system according to claim 12, wherein the network management system includes a decentralized automaton for assigning a lower rank to the alarms.

15. A system according to claim 12, wherein the network management system includes a decentralized automaton for storing the alarms in the memory.

16. A system according to claim 12, wherein the network management system includes a buffer memory for storing the alarms.

* * * * *